United States Patent
Kinzler et al.

(10) Patent No.: US 7,011,325 B2
(45) Date of Patent: Mar. 14, 2006

(54) ADJUSTABLE LENGTH SUSPENSION FORK FOR A BICYCLE

(76) Inventors: Frederick W. Kinzler, 1329 Huntington Tpke, Trumbull, CT (US) 06611; Walker P. Woodworth, 8 Coachman's Pl., Wilton, CT (US) 06897

( * ) Notice: Subject to any disclaimer, the term of this patent is extended or adjusted under 35 U.S.C. 154(b) by 0 days.

(21) Appl. No.: 10/846,228

(22) Filed: May 14, 2004

(65) Prior Publication Data

US 2004/0262879 A1    Dec. 30, 2004

Related U.S. Application Data

(60) Provisional application No. 60/470,726, filed on May 15, 2003.

(51) Int. Cl.
*B62K 25/10*    (2006.01)
(52) U.S. Cl. ............... 280/276; 280/279; 188/322.15; 188/344
(58) Field of Classification Search ............... 280/279, 280/276, 280, 283, 281.1; 188/322.13, 344, 188/322.15, 319.2
See application file for complete search history.

(56) References Cited

U.S. PATENT DOCUMENTS

| 5,634,653 | A  | * | 6/1997  | Browning ................... 280/276 |
| 6,120,049 | A  | * | 9/2000  | Gonzalez et al. ........... 280/276 |
| 6,343,807 | B1 | * | 2/2002  | Rathbun ..................... 280/276 |
| 6,615,960 | B1 | * | 9/2003  | Turner ................... 188/322.13 |
| 6,655,510 | B1 | * | 12/2003 | Kamioka ................. 188/266.5 |
| 6,802,407 | B1 | * | 10/2004 | Chen ........................ 188/319.2 |
| 2003/0001359 | A1 | * | 1/2003  | Miyabe ..................... 280/276 |

* cited by examiner

*Primary Examiner*—Lesley D. Morris
*Assistant Examiner*—Matthew Luby

(57) ABSTRACT

An improved, lightweight suspension fork for a bicycle with variable travel capability that maintains excellent torsional rigidity. This suspension fork allows for adjustable suspension travel adjusted at the handlebars of the bicycle. The suspension system includes a travel adjustment knob located at the handlebars of the bicycle. The travel adjustment knob is keyed with the main shaft of the suspension system so as to allow turning of the main shaft. Located on the main shaft within the suspension system housing is a length adjuster mechanism. The length adjuster moves linearly with respect to the housing as the main shaft is turned pulling the inner tube member of the suspension housing up or down relative to the outer tube section of the suspension housing, thereby changing the stroke of the suspension system.

24 Claims, 9 Drawing Sheets

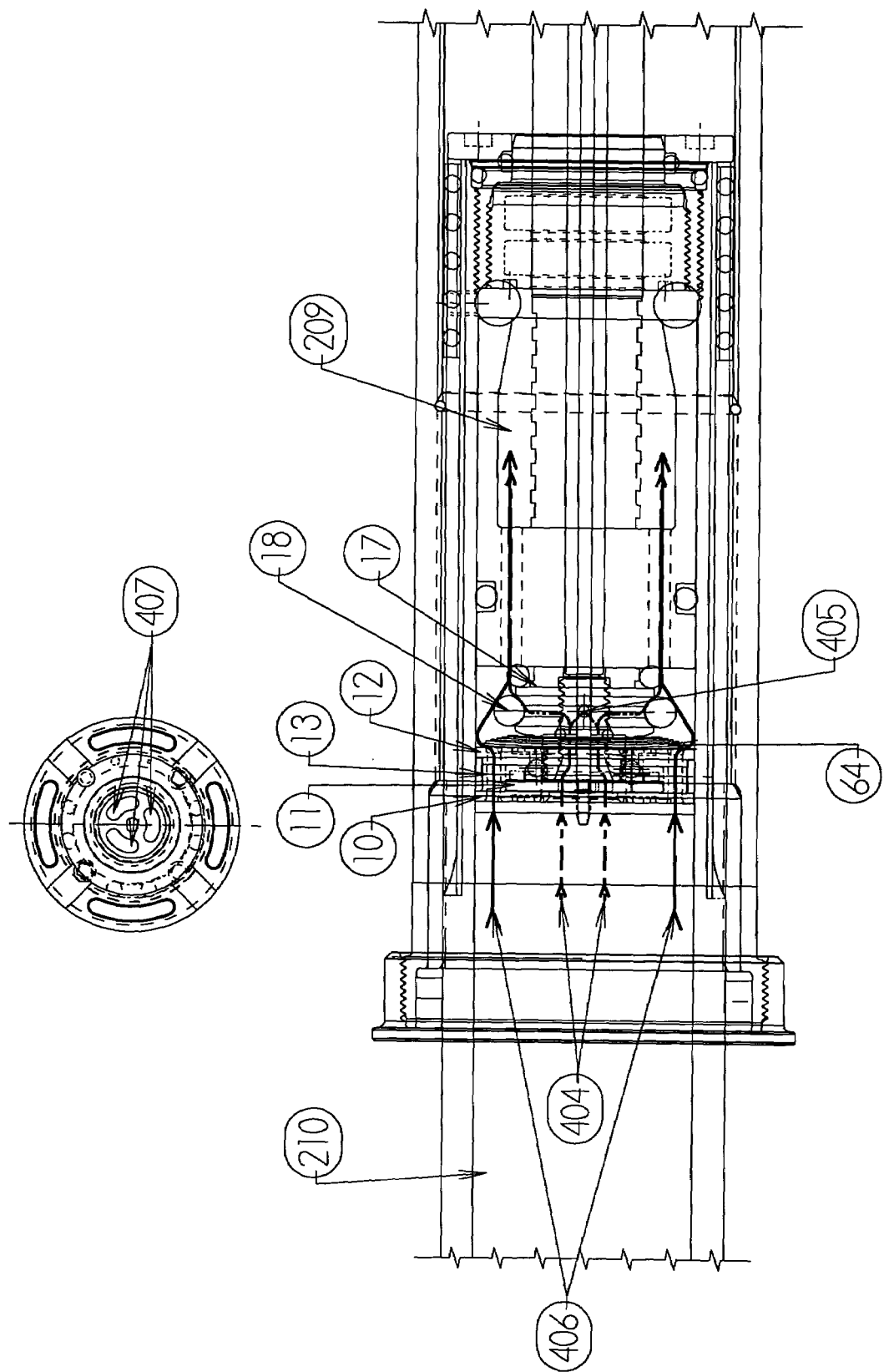

ADJUSTABLE LENGTH SUSPENSION FORK FOR A BICYCLE

CROSS-REFERENCE TO RELATED APPLICATIONS

This application claims the benefit of provisional patent application 60/470,726 filed May 15, 2003 by the present inventors.

RELATED U.S. APPLICATION DATA

U.S. CL . . . 280/276; 74/492; 188/271; 267/216; 280/283; 280/284; 280/777 188/319.1, 188/285

Int. Cl . . . B62K 025/08

Field of Search . . . 188/281; 188/266.4; 188/312; 188/315; 188/322.11; 188/313; 188/318; 188/319.1; 188/313; 188/317; 188/285; 280/276; 280/279; 280/284; 280/5.513; 280/5.501; 280/5.508; 280/5.514

References Cited:

U.S. PATENT DOCUMENTS

| | | | |
|---|---|---|---|
| 6,533,459 | March 2003 | Podhajecki et al. | 384/57 |
| 6,382,370 | May 2002 | Girvin | 188/299.1 |
| 6,360,857 | March 2002 | Fox | 188/281 |
| 6,328,291 | December 2001 | Marzocchi et al. | 267/64.5 |
| 6,305,704 | October 2001 | Vignocchi et al. | 280/279 |
| 6,505,719 | January 2003 | Gonzalez et al. | 188/319.2 |
| 6,360,858 | March 2002 | Gonzalez et al. | 188/319.2 |
| 6,241,060 | June 2001 | Gonzalez et al. | 188/319.2 |
| 5,380,026 | January 1995 | Robinson | 280/276 |
| 6,145,862 | November 2000 | D'Aluisio et al. | 280/276 |
| 6,135,477 | October 2000 | D'Aluisio et al. | 280/276 |
| 6,095,541 | August 2000 | Turner et al. | 280/276 |
| 6,042,091 | March 2000 | Marzocchi et al. | 267/64.15 |
| 5,634,652 | June 1997 | Tsai | 280/276 |
| 5,449,188 | September 1995 | Ohma | 280/276 |
| 5,346,236 | September 1994 | Ohma | 280/276 |
| 5,320,374 | June 1994 | Farris et al. | 280/276 |
| 5,195,766 | March 1993 | Dohrmann et al. | 280/276 |
| 5,350,185 | September 1994 | Robinson | 280/276 |
| 5,190,126 | September 1991 | Curnutt | 188/269 |
| 4,815,763 | March 1989 | Hartmann | 280/276 |
| 4,796,871 | January 1989 | Bauer et al. | 267/64.11 |
| 4,635,909 | March 1987 | Gold | 267/64.21 |
| 4,515,384 | May 1985 | Honma et al. | 280/276 |
| 4,344,637 | August 1982 | Williams Jr. et al. | 280/21 R |
| 5,494,302 | February 1996 | Farris et al. | 280/276 |
| 5,702,092 | December 1997 | Farris et al. | 280/276 |
| 5,924,714 | July 1999 | Farris et al. | 280/276 |
| 6,007,056 | December 1999 | Farris et al. | 280/276 |
| 6,155,541 | December 2000 | Farris et al. | 280/276 |
| 5,509,675 | April 1996 | Barnett | 280/276 |
| 5,195,766 | March 1993 | Dohrmann et al. | 280/276 |
| 4,971,344 | November 1990 | Turner | 280/276 |
| 4,609,202 | September 1986 | Miyakushi et al. | 280/276 |
| 6,604,886 | August 2003 | Kinzler et al. | 403/370 |

BACKGROUND OF THE INVENTION

1. Field of the Invention

The present invention relates to bicycle suspension systems and more particularly to a suspension fork assembly. This invention is improvements on current suspension systems, especially those incorporating the system first described by Farris et al. U.S. Pat. No. 5,320,374. A key objective of this invention is to achieve a longer length of travel and also to allow adjustable travel length of the bicycle suspension system using light weight components while maintaining a reasonable attitude of the bicycle.

2. Description of the Prior Art

Various suspension systems have been proposed and developed for bicycles. Many of these systems utilize a pair of telescoping assemblies between which the front wheel is mounted. Each assembly comprises an outer tube and an inner tube which is free to move in and out of the outer tube and is cushioned by a damper of one sort or another. The outer tubes are connected at the lower ends to the bicycle axle of the front wheel and the upper ends of the inner tube are connected together in a fashion similar to the usual upper end of a bicycle fork.

As is known to those skilled in the art, these types of suspension systems use pairs of anti-friction bushings to allow free movement of the inner tube within the outer tube. These bushings, by themselves, have undesirable static friction called "stiction." Because of this, the suspension systems using such bushings tend to stick and release. In addition, the two telescoping assemblies also have to be fixed together in some manner as through a "U" shaped yoke at the upper ends of the tubes to eliminate twisting. Even with this "U" shaped yoke the torsional stiffness of these types of assemblies is still limited. These forks are also heavy. They incorporate two sets of tubes, a yoke or other means to eliminate twisting and a steering tube designed to connect to the head tube of the bicycle frame.

A prior art example of a system which overcomes stiction is shown in Farris et al. U.S. Pat. No. 5,320,374 and subsequent applications. In this example an improved form of suspension system is described using an outer tube which is adapted to be mounted in and extend through the head tube of the bicycle frame and an inner tube connected to the fork of the bicycle which telescopes within the outer tube. The inner surface of the outer tube and the outer surface of the inner tube each have a plurality of axially arranged opposing longitudinal flat sections such as four on each tube. A plurality of hardened steel inner race shims are positioned longitudinally on the flats of the inner tube. A plurality of hardened steel outer race shims are positioned longitudinally on the flats of the outer tube. A plurality of needle bearings are disposed between the tubes in between the respective inner and outer race shims. This arrangement allows the two tubes to freely telescope in and out with respect to one another without any significant static friction and also serves to transmit the torsional steering force from the outer tube to the inner tube. This particular system is used extensively today because it can bear a combination of loads comprising very high radial loads and at the same time provide stable and tight rotational motion in steering of the front wheel through the suspension system from the handlebars.

Bicycle riders using suspension systems continue to desire long travel suspension systems to increase plushness, They also desire lightweight systems. Many suspension forks now employ a minimum of 80 mm and the industry trend is to go to 100 mm of travel and greater. In addition, riders would like some form of adjustability to the stroke length of the front suspension systems. Riders would like to shorten the suspension system while traversing uphill so as to lower the attitude of the bicycle while climbing. Subsequently, they would like to lengthen travel once again going on a straight path or downhill to take advantage of the plushness of a longer suspension system. Riders continue to desire to adjust these features at the handlebars vs. leaning over or stopping to make suspension system adjustments.

With the current needle bearing system, several problems exist to incorporate the torsional rigid features it provides with longer travel and suspension length adjustment. Described in the prior art, the highly stressed inner tube must be formed of a material and in a manner such that it bends rather than breaks. High strength steel is commonly used for the inner tube for this purpose, but it is heavy and counter to the consumer's preference. Lighter materials such as Aluminum in combination with strengthening processes such as shot-peening to strengthen the outer skin have been used as a material for the inner tube. Here-to-for, unfortunately, telescope assemblies whose inner tube connects to the fork crown with greater than 70 mm length of travel have been unable to pass stress testing using the present art as described in the aforementioned patents despite the additional costly process of shot-peening and use of expensive high-strength aluminum alloys. Attempting to increase the diameter of the tubes to add strength is also impractical as larger tube diameters increase cost, obsolete existing factory tooling and is generally counter to the consumer's aesthetic preference. Improvements in the design as outlined in U.S. Pat. No. 6,604,886 Kinzler et al have allowed travel to extend to 80 mm using lightweight materials.

Single tube suspension systems mounted in the head tube of the bicycle are unique and preferable over twin tube systems as they eliminate a considerable amount of weight. The main drawback of these systems is their limitation on the length of travel of the suspension system. The longest single telescoping suspension fork system of this configuration presently marketed is 80 mm of travel. Trying to increase this length to 100 mm poses significant problems. The bearing system described by Ferris et al has linear bearings in excess of 4 inches. The length of a 100 mm telescoping suspension portion of the fork using this approach would be in excess of 9 inches putting the attitude of the bike at a steep undesirable angle. Even then the stress on the inner tube member would be so great as to fail during use. There is a limit then on the conventional designs to limit travel to 80 mm or less when connected to a fork style unit. Attempts have been made to use a single-sided suspension system to position the suspension system to one side of the wheel allowing greater travel. While these systems work they are costly and heavy. They also bias the center of gravity of the bicycle pulling the bicycle to one side.

Prior art as described in Farris et. al use a cartridge damper system that exacerbates the length of the suspension portion. Such a restriction adds to the overall length of the telescoping system as the size of the damper components are greater than the space available in the inner tube. The damper commonly extends beyond the inner tube adding to the length of the telescoping system. In addition, such cartridge dampers utilize a coil or air rebound spring located in the inner tube member which places even further restrictions on the stroke length to 80 mm or less.

In the prior art, flats on the outer tube and inner tube of the suspension housing have flats running the entire length of the assembly. This design allowed for hard steel races to be easily installed and for easy installation of the needle bearings from one end. Unfortunately, the race stock is heavy steel and as the suspension system length grows, the length of the race stock grows increasing the weight of the system.

In current designs using the needle bearing system, the radial bearing capacity of the suspension system stops where the linear bearing sits. For much of the travel the bearing is significantly inside the suspension housing allowing flexing of the inner tube. Currently, a collar on the telescope assembly is used to prevent the bearing needles from exiting the telescope at the bottom of its excursion. If the bearing needles escape, the entire front fork may come apart. This is prevented by closing down the internal diameter of the collar. Because of the flexing, however, it cannot be closed down enough to encounter the full length of the bearing cage because the bending of the inner tube when under load may cause it to rub against the collar. A compromise must be made that places severe restrictions on the design, including the outside diameter of the inner tube. As the length of travel is increased this compromise becomes more difficult to make.

Currently no adjustable mechanism exists for Ferris et al. designed suspension forks with the ability to change suspension length at the handlebars.

Damper Systems and Adjustable Travel

Damper systems of most suspension forks other than those incorporating the single tube suspension unit described by Farris et al. are adjustable at the top of the crown or at the bottom of the suspension fork which is inconvenient for the user to make adjustments. It would be beneficial to allow all these adjustments at a convenient location such as the handlebars for the rider. Damper systems allowing for adjustability at the handle bars allow adjustment for rebound, but not low-speed compression. In addition, many damper systems do not progressively stiffen as the length of travel is used causing topout of the damper and unnecessary roughness. It would be beneficial to add progressivity damping characteristics to a suspension fork that allow the suspension system to increase in stiffness as the travel is used up.

Adjusting ride height if performed at all is also done at the top of the crown not where it is convenient. These systems employ a knob that is turned. The rider must then push down on the fork to let the fork release to its new position. These devices are not infinitely adjustable between two fixed travel positions therefore they do not allow the rider to adjust to a convenient position. It would be beneficial to allow all these adjustments at a convenient location for the rider such as the handle bars and allow the rider to adjust ride position infinitely as the riding is taking place.

OBJECTS AND ADVANTAGES

Several objects and advantages of the present invention are:
1) to provide an improved, lightweight suspension fork with increased travel capability that maintains torsional rigidity, but increases radial rigidity. The suspension fork allows for adjustable suspension travel adjusted at the handlebars of the bicycle.
2) to provide a unique method of adjusting suspension travel in an extremely tight space without negatively impacting either the outer or inner tube's strength and with convenient user access for adjustment in the field.
3) to provide a rebound spring external to the inner damper tube to shorten the telescoping length to mitigate an undesireable attitude of the rider and fatigue stress on the inner tube.
4) to provide the suspension damping adjustments at the handlebars for user convenience.
5) to provide the suspension system with progressive damping characteristics that stiffen the suspension as the travel of the suspension fork is used up.

SUMMARY

In accordance with the present invention, a long travel suspension fork for a bicycle comprising an elongated inner tube and outer tube co-axially mounted together to telescope with each other that incorporates a main shaft and a travel adjustment apparatus coupled together. By rotating the main shaft the position of the inner tube relative to the outer tube is changed thereby adjusting the length of travel of the suspension system. Inherent to accomplishing the length of travel, the suspension unit incorporates a slidable seal between the inner and outer tubes so as to form a rebound gas spring thus eliminating the need for the rebound spring to be housed within the inner tube. This external spring effectively shortens the needed length of the tubes improving strength characteristics of the suspension fork and ride attitude.

BRIEF DESCRIPTION OF THE DRAWINGS

FIG. 5A shows a detailed cross-sectional view of the piston and flow during compression.

DETAILED DESCRIPTION OF THE INVENTION

Telescoping Housing Mechanism

Figure 1:
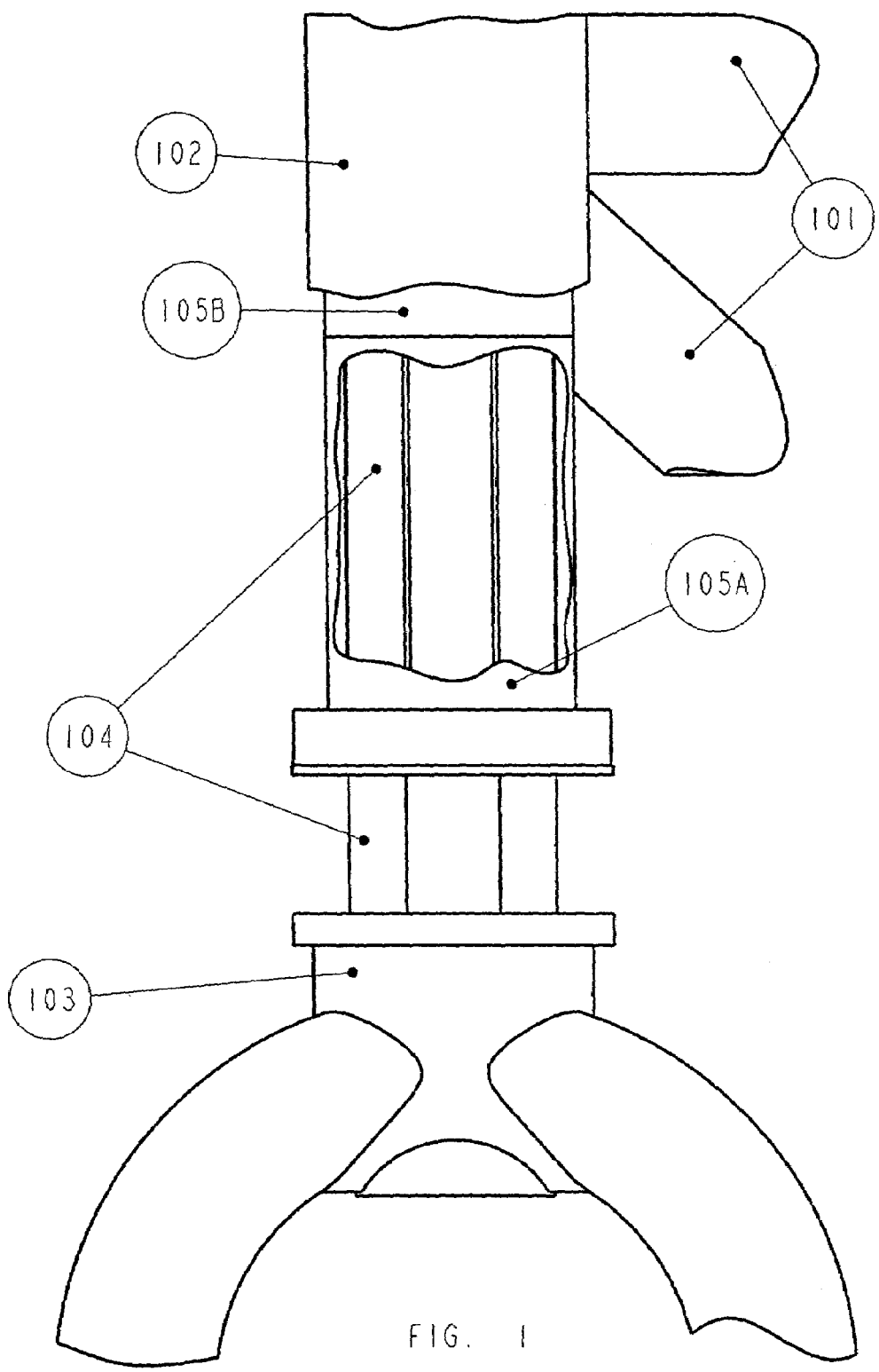
FIG. 1 shows a simplified view illustrating the preferred form of suspension fork according to the present invention.

FIG. 1 shows a bicycle frame (partial) 101 along with a head tube 102. A fork crown (partial) 103 has an inner tube 104 of a telescoping assembly affixed into it. The outer tube, comprised of two pieces 105A and 105B of the telescoping assembly is pressed into the head tube 102 using upper and lower journal bearings (not shown) to allow for steering rotation. The upper end of the outer tube 105B is connected to the handlebar stem (not shown). It should be noted that for this embodiment the outer tube is comprised of two pieces, however, the outer tube could be one piece.

Figure 2:
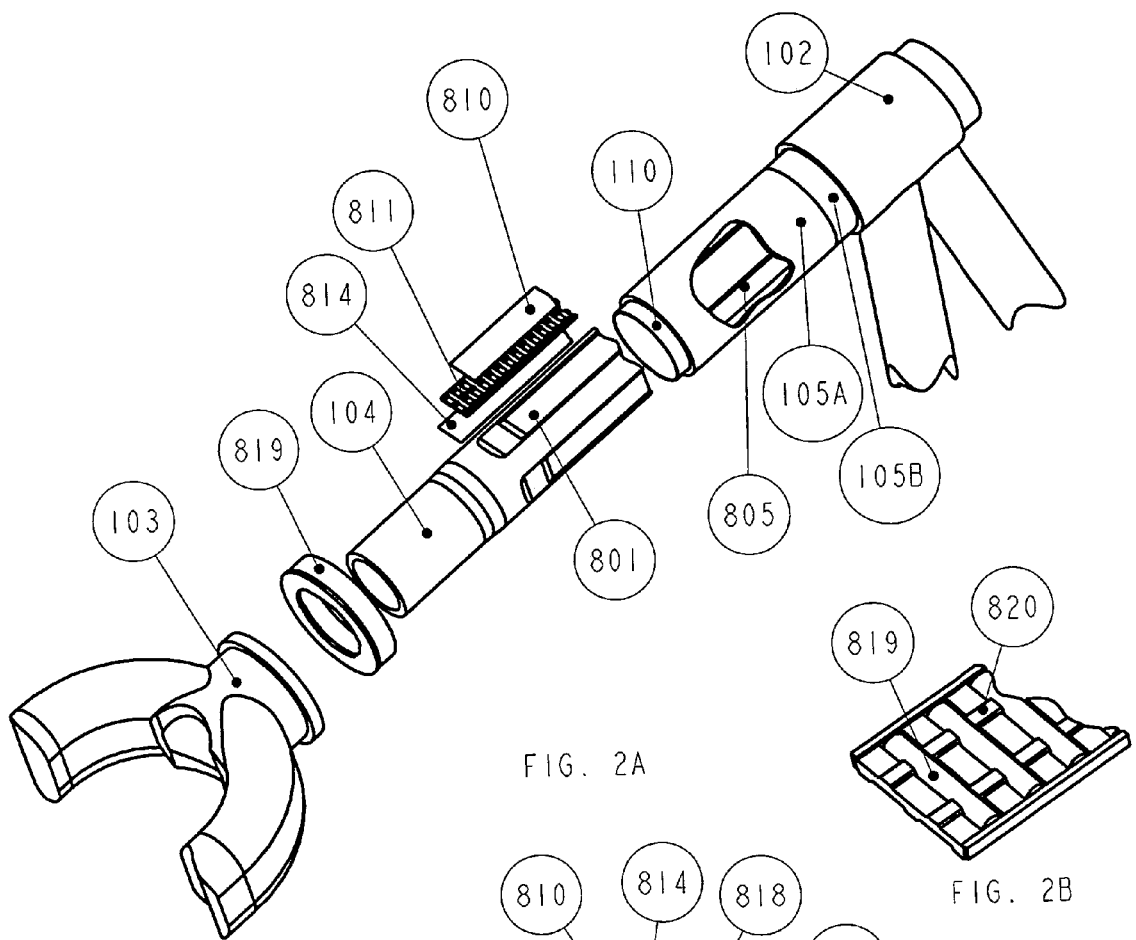
FIG. 2A is an exploded view of the telescoping assembly in its preferred embodiment illustrating inner and outer tubes, a needle bearing assembly, an inner race, outer race and collar.
FIG. 2B is a partial view of a needle bearing assembly showing the relationship of the cage and needle.
FIG. 2C is a cross-sectional view illustrating the relationship of outer races, bearing assemblies, inner races, inner tube and outer tube in assembly form.

FIG. 2A is an exploded view of the telescoping assembly showing parts germane to this invention. Over a specific length in the outer wall of the inner tube 104 depicts a plurality of axially extending longitudinal flat surfaces or flats of which one is shown 801. In the preferred embodiment there are four such flats, however there can be more or less flats used. Over a specific length in the inner wall of the outer tube 105A, there are axially extending flats of which one is shown 805 that are opposing the corresponding flats on the inner tube. Contained between the inner and outer tube sets of flats are sets of outer races 807–810 of which one is shown, bearing needle assemblies of which one is shown 811 and inner races of which one is shown 814. The inner and outer races are commonly made of hardened steel. There are a corresponding number of sets of bearing needle assemblies with the number of flats on the outer tube and inner tube. In the preferred embodiment there are 4 sets of bearing assemblies, however, there could be more or less. Housed within the outer tube section 105A is a lubricious bushing 110 to provide additional radial load bearing support.

FIG. 2B shows a detailed view of the bearing needle assemblies. These assemblies are a plurality of hardened chrome steel needle bearings 819 typically 5 needle bearings housed in a plastic cage 820 and ride in between corresponding inner and outer races. It is important to note that current systems that incorporate needle bearings employ 22 needles and that the overall length of the needle cage assembly is approximately 4 inches. For travel of 100 mm using these long cage assemblies, the length of outer tube sections 105A and 105B would be in excess of 9 inches making the fork too long and causing the outer tube section 105B to protrude too far above the handle bars or put the rider at an undesirable angle. In addition as shown in FIG. 2A, the length of the flats (one shown 801) on the inner tube is significantly long decreasing the cross-section area of the inner tube along the length. Because the inner tube 104 is captured and held at crown 103, tremendous flexing can occur. Inner tubes traditional have been made from steel with limited travel to limit stress levels in the inner tube 104. Unique to this suspension system is the combination of a load bearing bushing, sealed gas chamber between the inner tube 104 and the outer tube sections 105A and 105B and a smaller linear bearing system employing a cage with far fewer needles. By using a combination of a load bearing bushing 110 and a smaller bearing cage assembly containing 5 needles, the length of flat required for 100 mm of travel is less and thus shortens the required length of outer tube sections 105A and 105B. In addition, the desired torsional rigidity of the system is maintained. The cross-sectional area of the tube is increased for most of the tube thus allowing for decreased stress levels. Lightweight aluminum can be used as the inner tube 104.

FIG. 2C shows a cross-sectional view of the preferred embodiment of the telescope highlighting the relationship of the inner tube 104, the outer tube section 105A, the inner races 815–818, the outer races 807–810 and the needle bearing assemblies 811–814.

The needle bearing assemblies 811–814 allow the inner tube 104 to travel freely in an axial direction with respect to the outer tube sections 105A. Additionally, the needle bearing assemblies in conjunction with the associated flats on the inner tube, inner races 815–818, outer races 807–810 and outer tube 105A enable the steering torsional or rotary action to be imparted from handlebars connected to the handlebar stem via the telescoping tubes to the fork and to the front wheel (not shown). The needle bearings bear high radial loads from the fork during movement over rough terrain. The length of the flats on the inner tube determine the amount of telescoping action. Typically the amount of telescoping action is desired to be 80 mm to 130 mm.

Integral Damping System

Figure 3:
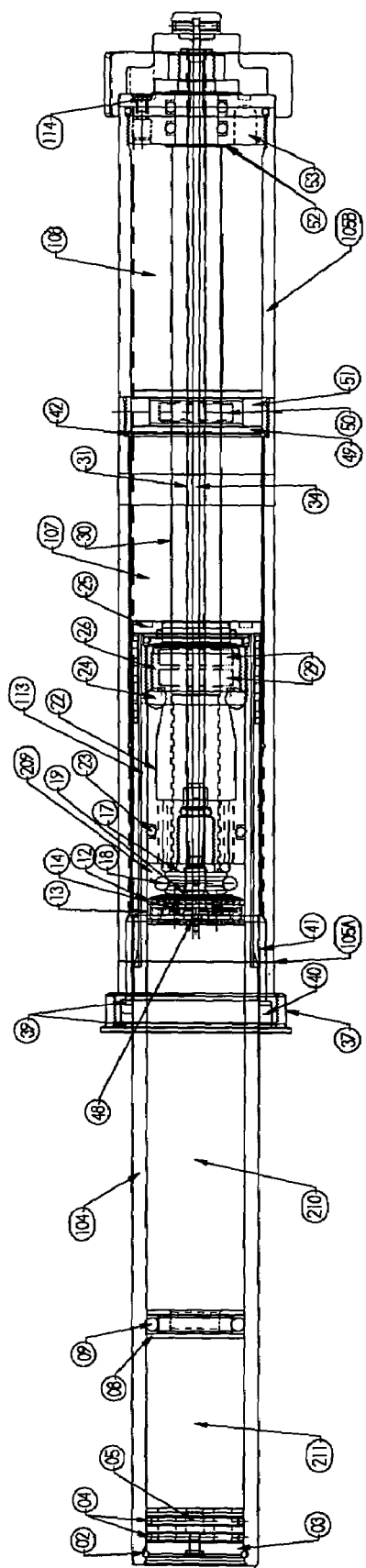
FIG. 3 shows the detailed configuration of the preferred embodiment of the suspension system.

FIG. 3 illustrates the integral damping system consisting of a progressive gas rebound spring system comprised of chambers 107 and 108 and an integral damping unit 113 generally shown being housed in inner tube 104. Outer tube section 105A contains a seal 40 which is housed in the outer tube wall and rides along a specific length of inner tube 104 and a lubricious bushing 41 which provides axial stability of the inner and outer tubes. A collar 37 serves to prevent the seal 40 from exiting the outer tube section 105A. Outer tube section 105B, which is threaded to outer tube section 105A, contains a piston 49 and an end cap 53. Together the seal 40, outer tube sections 105A and 105B, piston 49 and end cap 53 provide a pair of gas chambers 107 and 108 which serve as a rebound spring for the integral damping system. The gas volume in gas chamber 108 is pressurized between 50 and 150 psi through port 114, depending on the desired ride quality and weight of the rider. This pressurization forces piston 49 downward until the pressure in chamber 107 equals the pressure in 108. During riding, as the rider encounters rough terrain like a rock or bump that forces the inner tube 104 upward, the pressure in chamber 107 starts to increase, piston 49 moves axially upward to compensate for the increase in pressure until pressures in chambers 107 and 108 are in equilibrium. After the bump is traversed, the combined gas pressure in chambers 107 and 108 push the inner tube 104 back to the equilibrium ride position. Pressurized gas is contained in volume 108 serves as a progressive gas rebound spring. The progressivity of the gas spring is dependent on the contact or lack of contact of the inner tube 104 with the piston 49.

Unique to this suspension mechanism is the use of the split air chamber design separating gas chambers 107 and 108. Gas chamber 108 can be charged to a higher pressure than chamber 107 due to the fact that as gas chamber 108 is charged piston 49 moves axially downward until it touches retaining clip 42 at the interface point of outer tube section 105A and 105B. Retaining clip 42 holds piston 49 even though additional pressurization is applied to chamber 108. This differential pressure set up allows inner tube 104 to eventually touch piston 49 during compression of the fork. At that point the additional spring pressure provided by chamber 108 engages and resists further movement of inner tube 104 upward, creating even further resistance to movement. The pressures in chambers 107 and 108 can be modulated to achieve different rebound spring progressivity.

Also unique to this suspension mechanism is the formation of the gas chamber 107 external to the inner tube. O-ring 40 located in collar 37 supported on either side by backup rings 39 slides along the external surface of the inner tube. Gas chamber 107 is formed in the space between the inner tube 104 and outer tube section 105A and the piston 49. Gas chamber 107 then serves as the main rebound spring during compression of the suspension system when inner tube 104 compresses into outer tube section 105A The advantages of the linear bearing system are still maintained by using a smaller linear bearing system employing a cage with far fewer needles. Using a combination of a load bearing bushing 41 and a smaller bearing cage assembly containing 5 needles, the length of flat on the external surface of the inner tube required for 100 mm of travel is less. The desired torsional rigidity of the system is maintained. The cross-sectional area of the tube is increased for most of the tube thus allowing for decreased stress levels. Lightweight aluminum can be used as the inner tube 104. By creating a shorter flat region, the external surface of the inner tube 104 for the length of travel is smooth providing an effective sealing surface for O-ring 40, thus allowing the creation of the gas chamber 107.

Figure 4:
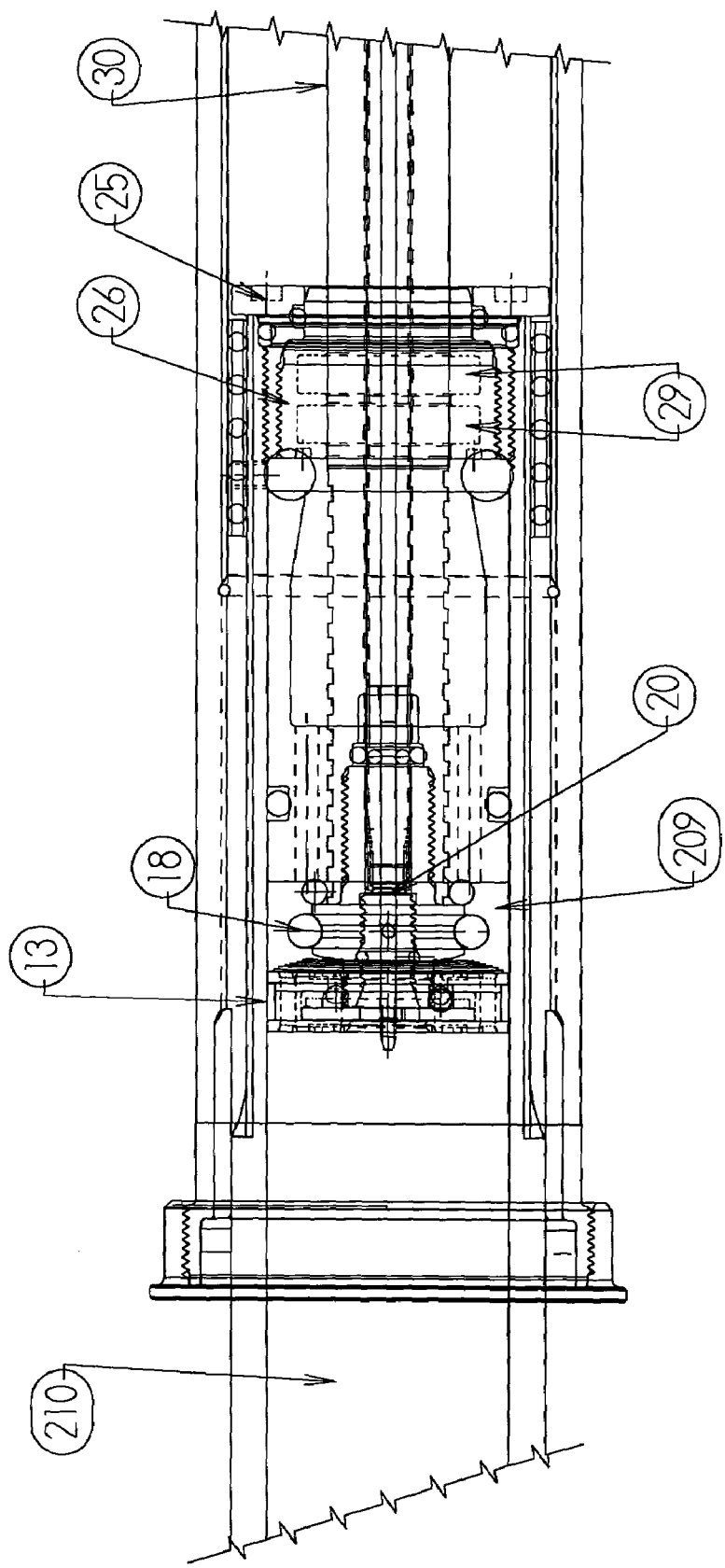
FIG. 4 shows a detailed cross-sectional view of the damping system housed in the inner tube.

FIG. 3 and FIG. 4 illustrate the damping unit 113 housed in inner tube 104. The damping unit includes a series of shafts 30,31 and 34 which have one degree of freedom and operate independent of each other to provide rebound, compression and suspension travel adjustment. The shafts pass through a damper cap 26 which is contained within a stop cap 25. The stop cap serves to house the damper cap and provide a stop for the needle bearing assemblies 811–813 and inner races 814–816. The stop cap prevents the bearing assemblies 811–813 and inner races 814–816 from migrating past the end of the inner tube 104 during motion. A series of seals 29 provide a fluid seal against shaft 30. A ported piston assembly 13 generally depicted is connected to the shaft 30 via a piston connect assembly 17. As the inner tube 104 moves axially being forced by the wheel along the terrain, the piston assembly 13 moves axially relative to the inner tube. The interior of the inner tube 104 is divided into 3 chambers 209, 210 and 211. Chambers 209 and 210 contain damping fluid whereas chamber 211 contains gas under pressure. As the piston assembly 13 moves axially relative to the inner tube, damping fluid progresses through the piston assembly 13 between chambers 209 and 210 to cause damping. Chamber 211 is separated from chamber 210 through a floating piston 08. Chamber 211 is filled with high pressure gas filled through a port seal 05 in end cap 03. The gas chamber 211 serves to resist the piston assembly 13 movement, but also serves to compensate for the volume change as the shaft assembly moves in and out of the damping unit. By so compensating, cavitation of the damping fluid is avoided. The floating piston contains a seal 09 which prevents mixing of oil in chamber 210 and gas in chamber 211. Retaining clip 02 prevents end cap 03 from exiting the bottom of inner tube 104. O-rings 04 prevent air leakage around end cap 03 when gas in chamber 211 is pressurized.

Piston Assembly

Figure 5B:
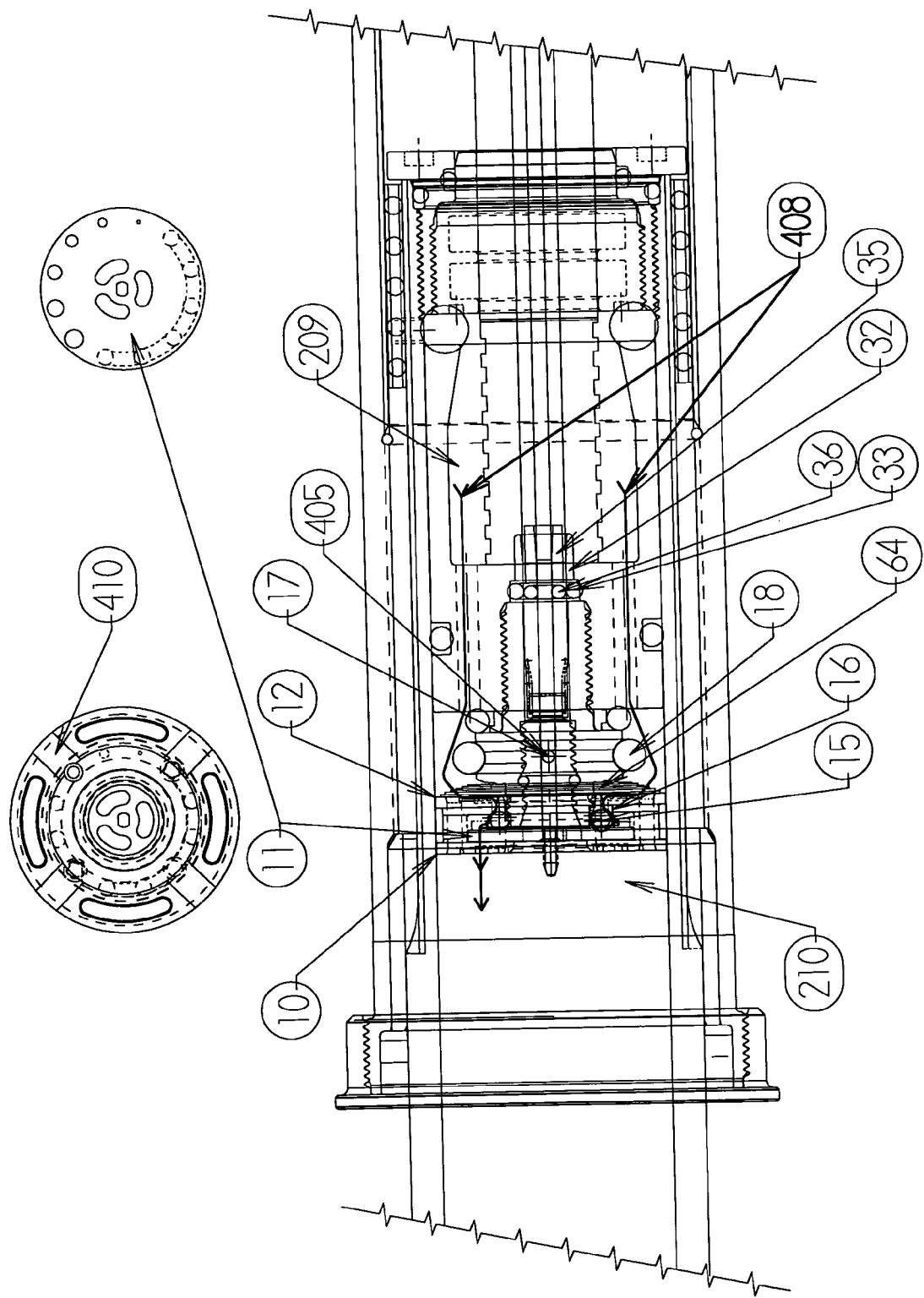
FIG. 5B shows a detailed cross-sectional view of the piston and flow during rebound.

Unique to this invention is a three part piston assembly that allows independent control of low speed and high speed compression as well as rebound adjustment. FIG. 5A shows the piston assembly 13 connected to a piston connect element 17 to the main shaft 30. The piston assembly 13 is comprised of a lower half piston section 10 a rebound adjustment disc 11 and an upper piston section 12. During "low speed" compression, the inner tube 104 moves axially upward forcing damping fluid to move from chamber 210 to chamber 209 through the "kidney slots" 407 in central portion of the three-piece piston element 13. As depicted by flow line 404 for "low speed" compression flow, fluid moves through the center of piston element 13 and out holes 405 in piston connect element 17 underneath O-ring 18. For "high speed" compression, fluid additionally moves along flow line 406 through "kidney slots" in lower half piston section 10, through upper piston section pushing shims 64 outward. Fluid flows out from under shims 64 into chamber 209. As shown in FIG. 5B, ball 15 and spring 16 form a ball valve to prevent flow during compression through rebound adjustment disc 11. In FIG. 5B, rebound flow moves fluid from chamber 209 to 210 along path 408. Fluid flow moves through radial slots 410 on top side of upper half piston section 12. Fluid moves through holes in upper half piston section 12 through a hole in rebound adjustment disc 11 located between upper and lower piston halves 12 and 10 respectfully and out slots in lower half piston section 10. O-ring 18 prevents fluid flow through piston connection element 17.

Damping Adjustment Mechanisms

Figure 6:
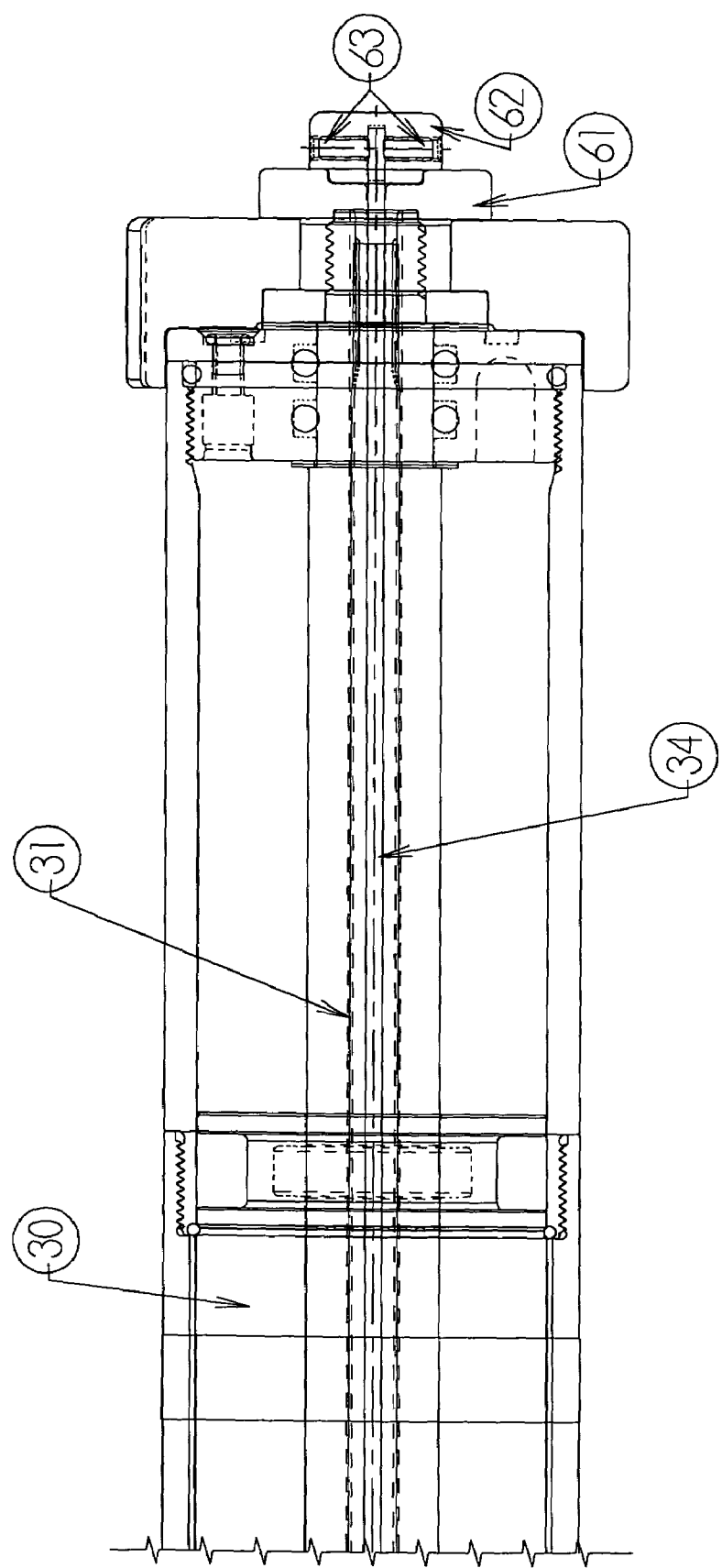
FIG. 6 shows a cross-sectional views of the damping adjustment mechanisms for rebound and compression.

Unique to this invention is a three shaft adjustment mechanism that allows independent control of suspension length, compression and rebound suspension features. Each adjustment acts independently of the other. FIG. 6 shows a highlighted sectional view of the damping adjustment mechanisms which allows independent control of rebound and compression characteristics of the damping system at the handlebars. Referring to FIGS. 5B and 6, Rebound Damping adjustment knob 62 is connected to shaft 34 via set screws 63 and is keyed with rebound adjustment disc 11. By rotating knob 62, rebound adjustment disc 11 turns. Rebound adjustment disc 11 containing various orifice holes of different sizes. When rebound adjustment disc 11 is rotated, a hole in the rebound adjustment disk aligns with a hole in upper piston half 12 to provide a flow path for fluid between chamber 209 and 210. Rebound rate is depended on the hole size in the rebound adjustment disk. Oil flows through the rebound rate screw and out the bottom of piston disc 10. "Low speed" compression adjustment knob 61 is threaded to compression adjustment shaft 31 which connects to "low speed" adjustment screw 20. As the low speed compression adjustment knob 61 is turned, low speed adjustment screw 20 turns inside piston connect element 17 and moves axially downward or upward depending on the direction of rotation. Low speed adjustment screw 20 moves across holes 405 in piston connect element 17 thus modulating the orifice size 405.

O-ring seals 36, and 33 prevent fluid seepage in between rebound and compression adjustment shafts 31 and 34 and between compression adjustment shaft 31 and main shaft 30. Back-up elements 32 and 35 are fixed in position on compression adjustment shaft 31 and rebound adjustment shaft 34 to serve as an O-ring back-ups for O-rings 33 and 36, respectfully.

Suspension System Stroke Length Adjustment

Figure 7A:
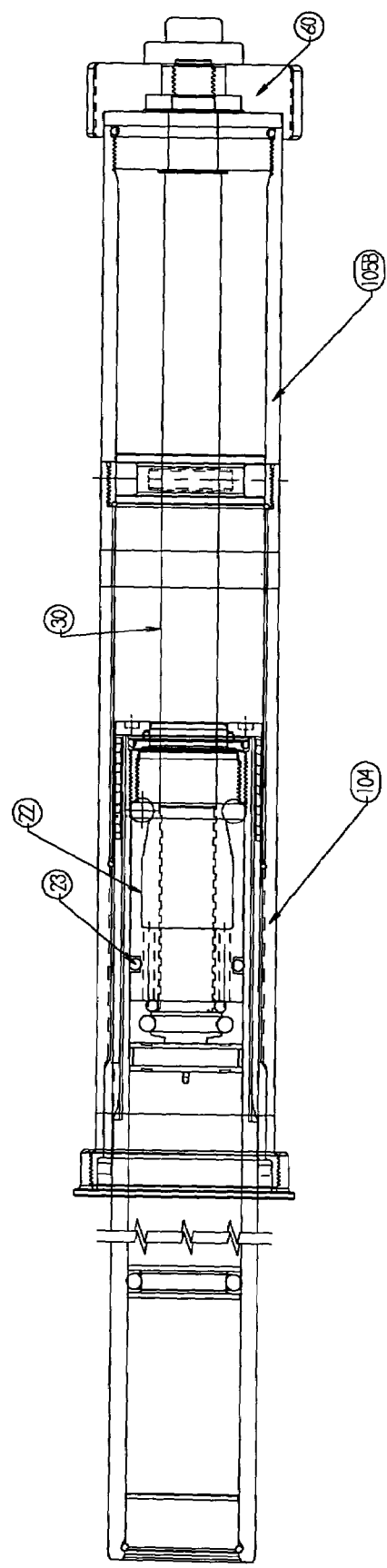
FIG. 7A shows a cross-section view of the suspension stroke length adjustment mechanism at the full travel position.
Figure 7B:
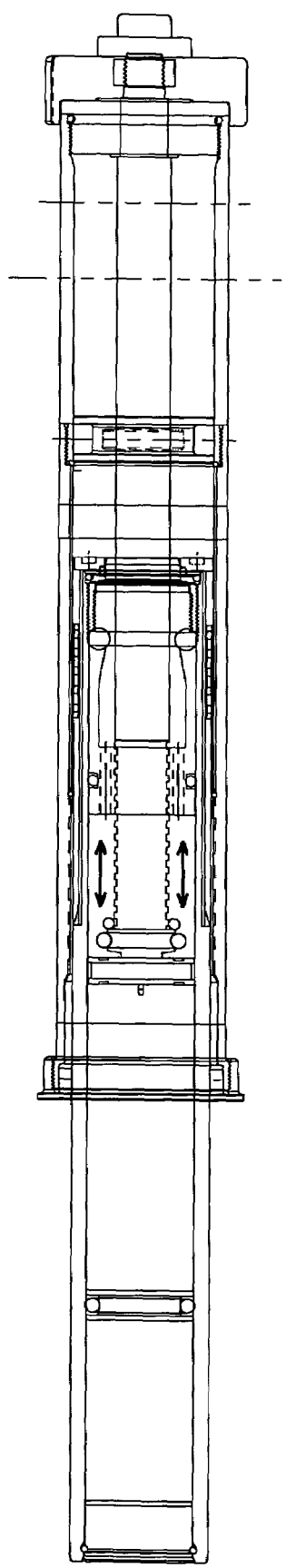
FIG. 7B shows a cross-section view of the suspension system stroke length adjustment mechanism at a smaller length of travel position.

Riders would like to shorten the suspension system while traversing uphill so as to lower the attitude of the bicycle while climbing. Subsequently, they would like to lengthen travel once again going on a straight path or downhill to take advantage of the plushness of a longer suspension system. Riders continue to desire to adjust these features at the handlebars vs. leaning over or stopping to make suspension system adjustments. Unique to this suspension system is a suspension travel adjustment mechanism. FIGS. 7A and 7B shows the cross-section view of the suspension length adjustment mechanism. Suspension system stroke length adjustment is obtained by length adjuster 22, travel adjustment knob 60 and main shaft 30. Travel of the suspension system is adjusted by turning the travel adjustment knob 60. The travel adjustment knob 60 is keyed with the main shaft at the underside of the adjustment knob using a standard hex configuration so as to allow turning of the main shaft 30 clockwise or counterclockwise as the travel adjustment knob 60 is turned. Length adjuster 22 is threaded onto the outside of main shaft 30. As the travel adjustment knob 60 is turned, the main shaft 30 moves linearly relative to length adjuster 22. Length adjuster 22 does not rotate because of friction between O-ring 23 and the inside wall of inner tube 104. Referring to FIG. 3, main shaft 30 is fixed to the outer tube 105B below the travel adjustment knob 60 using a hex nut 58 which resides on top of a cap 57 secured to outer tube 105B. As the main shaft 30 turns, the inner tube moves relative to the length adjuster 22. Length adjuster 22 pulls the inner tube 104 up relative to outer tube 105B, and shortens the suspension stroke as the travel adjustment knob 60 is turned clockwise. Turning the adjustment knob 60 counter-clockwise moves the main shaft 30 up lengthening the suspension stroke.

What is claimed is:

1. A bicycle fork containing a suspension unit comprising;
an elongated inner tube and outer tube co-axially mounted together to telescope with respect to each other, the inner tube having an outer wall with at least three or more axially extending longitudinal flat surfaces, the outer tube having an inner wall with a like number of corresponding flat surfaces as the inner tube,
a like number of inner race shims located longitudinally along the flat surfaces of the inner tube,
a like number of outer race shims located longitudinally along the flat surface of of the outer tube,
a like number of needle bearings located longitudinally between inner and outer race shims whereby the flat surfaces of the inner and outer tubes in combination with the needle bearings allow the inner and outer tubes to telescope smoothly with respect to each other;
a suspension unit, the suspension unit comprising;
a main shaft fixed to one end of the outer tube and disposed in the inner tube
a travel adjustment apparatus coupled to said main shaft and disposed in the inner tube,
means for rotating said main shaft so as to move said travel adjustment apparatus axially thereby changing the position of the inner tube relative to the outer tube.

2. A bicycle fork as in claim 1, containing a shock absorbing system disposed within and coupled between said inner and outer tubes.

3. A bicycle fork as in claim 2 wherein the shock absorbing system contains a main shaft coupling said outer tube to an oil piston disposed inside said inner tube.

4. A bicycle fork as in claim 2, wherein the shock absorbing system uses the internal volume of said inner tube as the oil cartridge of the shock absorber.

5. A bicycle fork as in claim 3, wherein the shock absorbing system contains a rebound spring external to said inner tube.

6. A bicycle fork as in claim 5 wherein the rebound spring comprises;
a pair of first and second gas chambers separated by a piston
said first gas chamber is formed between the inner wall of said outer tube and the outer wall of said inner tube and said piston
said second gas chamber formed between the inner wall of said outer tube, said piston and sealing means at one end of said outer tube.

7. A bicycle fork as in claim 5 wherein a collar is coupled to the outer wall of said outer tube and wherein a sealing means is disposed within said collar slidably engaged to the outer wall of said inner tube thereby providing a seal against said inner tube forming said rebound spring.

8. A bicycle fork as in claim 6 wherein the pressure in said second gas chamber is significantly greater than said first gas chamber thereby creating a position dependent resistance depending on the position of said inner tube with respect to said outer tube.

9. A bicycle fork as in claim 6 wherein said piston contains a sealing means to allow passage of said main shaft and provides a seal against said main shaft for the purposes of preventing air leakage.

10. A bicycle fork as in claim 6 where the sealing means at one end of said outer tube is a cap mounted to the inner wall of said outer tube with an O-ring seal.

11. A bicycle fork as in claim 1 wherein a load bearing bushing is coupled to said inner wall of the outer tube thereby substantially enhancing the radial load bearing capability of the telescoping housing.

12. A bicycle fork containing a telescoping suspension unit comprising;
- an elongated inner tube and outer tube co-axially mounted together to telescope with respect to each other, the inner tube having an outer wall with at least three or more axially extending longitudinal flat surfaces, the outer tube having an inner wall with a like number of corresponding flat surfaces as the inner tube,
- a like number of inner race shims located longitudinally along the flat surfaces of the inner tube,
- a like number of outer race shims located longitudinally along the flat surface of of the outer tube,
- a like number of needle bearings located longitudinally between inner and outer race shims whereby the flat surfaces of the inner and outer tubes in combination with the needle bearings allow the inner and outer tubes to telescope smoothly with respect to each other,
- a first sealing means at one end of the outer tube
- a second sealing means fixed to the outer tube slidably engaged to the outer wall of the inner tube for the purposes of forming a gas chamber between said inner and outer tubes.

13. A bicycle fork as in claim 12 wherein the length of the race flats on the inner tube and the length of the needle bearings are less than 30% of the length of the inner tube.

14. A bicycle fork as in claim 12, containing a shock absorbing system disposed within and coupled between said inner and outer tubes.

15. A bicycle fork as in claim 14 wherein said shock absorbing system contains a main shaft coupling said outer tube to an oil piston disposed inside said inner tube.

16. A bicycle fork as in claim 12, wherein the gas chamber is pressurized serving as a rebound spring external to the inner tube.

17. A bicycle fork as in claim 14, wherein said shock absorbing system uses the internal volume of said inner tube as the oil cartridge of said shock absorbing system.

18. A bicycle fork as in claim 14 wherein said shock absorbing system contains a rebound spring comprising;
- a pair of first and second gas chambers separated by a piston,
- said first gas chamber formed between the inner wall of said outer tube and outer wall of said inner tube and said piston,
- said second gas chamber formed between the inner wall of said outer tube, said piston and sealing means at one end of said outer tube.

19. A bicycle fork as in claim 18 wherein the pressure in said second gas chamber is significantly greater than said first gas chamber thereby creating a position dependent resistance depending on the position of said inner tube with respect to the outer tube.

20. A bicycle fork as in claim 18 wherein the piston contains a seal slidably engaged to the main shaft to allow passage of the main shaft and provides a seal against the main shaft for the purposes of preventing air leakage.

21. A bicycle fork as in claim 18 where the sealing means at one end of the outer tube is a cap mounted to the inner wall of the outer tube with an O-ring seal.

22. A bicycle fork as in claim 18 wherein a collar is coupled to the outer wall of said outer tube and wherein a O-ring is disposed within said collar slidably engaged to the outer wall of said inner tube thereby providing a sealing means against said inner tube.

23. A bicycle fork as in claim 14 wherein said shock absorbing system contains independent means of adjusting rebound and compression damping.

24. A bicycle fork as in claim 23 wherein said adjustment means for rebound and compression damping comprises;
- a rod, tube and oil piston assembly;
- said rod disposed inside said tube;
- said rod connected to a rebound adjustment disk housed internally within said oil piston assembly on one end and a rebound adjustment knob on the other end wherein as the rod is turned said rebound adjustment disk aligns various size holes with said oil piston assembly orifice for the purposes of adjusting the return rate of fluid from one side of said oil piston assembly to the other
- a piston connection element containing holes;
- said tube connected to said piston connection element on one end and a compression adjustment knob on the other end;
- said piston connection element containing an adjustment screw whereby as the tube is rotated the adjustment screw moves to block or unblock the fluid flow across said piston connection element holes;
- shims held between said piston connection element and said oil piston assembly located on the top of said oil piston assembly wherein the shims block fluid flow in the rebound direction, but allow fluid flow under high-speed compression characteristics in the compression direction;
- said oil piston assembly allowing fluid flow through its center to said piston connection element under low speed compression and additionally through additional orifices on the top side of said oil piston assembly blocked by said shims to allow additional fluid flow in high speed compression.

* * * * *